(12) United States Patent
Sacks

(10) Patent No.: US 9,861,225 B1
(45) Date of Patent: Jan. 9, 2018

(54) SINGLE CUP COFFEE AND TEA MANUAL BREWING SYSTEM

(71) Applicant: Jerome E Sacks, Lexington, MA (US)

(72) Inventor: Jerome E Sacks, Lexington, MA (US)

(*) Notice: Subject to any disclaimer, the term of this patent is extended or adjusted under 35 U.S.C. 154(b) by 0 days.

(21) Appl. No.: 15/186,496

(22) Filed: Jun. 19, 2016

Related U.S. Application Data

(63) Continuation-in-part of application No. 14/542,566, filed on Nov. 15, 2014, now Pat. No. 9,526,368.

(60) Provisional application No. 62/319,140, filed on Apr. 6, 2016, provisional application No. 62/346,638, filed on Jun. 7, 2016.

(51) Int. Cl.
*A47J 31/06* (2006.01)
*A47J 31/10* (2006.01)
*A47J 31/02* (2006.01)

(52) U.S. Cl.
CPC ............. *A47J 31/10* (2013.01); *A47J 31/02* (2013.01)

(58) Field of Classification Search
CPC ...... A47J 31/02; A47J 31/061; A47J 31/0605; A47J 31/0615
USPC .... 99/281, 285, 295, 299, 305, 306; 426/79, 426/433
See application file for complete search history.

(56) References Cited

U.S. PATENT DOCUMENTS

| | | | | |
|---|---|---|---|---|
| 2,951,431 A | * | 9/1960 | Hugentobler | A47J 31/0605 99/285 |
| 4,033,248 A | | 7/1977 | DeSalino | |
| 4,056,050 A | * | 11/1977 | Brown | A47J 31/0573 99/299 |
| 4,343,232 A | * | 8/1982 | Corbier | A47J 31/0621 99/295 |
| 4,697,502 A | * | 10/1987 | English | A47J 31/02 99/299 |
| 4,893,552 A | * | 1/1990 | Wunder | A47J 31/061 99/295 |
| 5,085,135 A | | 2/1992 | Collignon | |
| 5,249,509 A | * | 10/1993 | English | A47J 31/02 99/285 |
| 5,957,036 A | * | 9/1999 | Warner | A47J 31/061 99/279 |
| 6,327,965 B1 | | 12/2001 | Lin Tien | |
| 6,494,128 B1 | | 12/2002 | Yu | |

(Continued)

FOREIGN PATENT DOCUMENTS

FR 1214557 4/1960

*Primary Examiner* — Thien S Tran
(74) *Attorney, Agent, or Firm* — Jerome Sacks

(57) ABSTRACT

The disclosure presents a single cup coffee brewer comprised of a dripper component, a drip rate control component, and a plunger assembly. The dripper component has a cylindrical brewing container and a removable cylindrical tube that enables an appropriately sized standard basket filter to be inserted snugly in the cylindrical brewing container. The drip rate control component, attached to the dripper component, has a lever that controls the drip control rate of the dripper component from a zero drip rate to a maximum value. The coffee brewer may therefore be used similar to a cone dripper, but with a user controlling the drip rate, or as an infuser perhaps followed by a dripper. The plunger assembly converts the dripper component and the drip rate control component into an Espresso plunger by allowing the user to force brewing coffee through the basket filter into a cup. Various embodiments are presented.

8 Claims, 12 Drawing Sheets

(56) References Cited

U.S. PATENT DOCUMENTS 7,849,784 B2 12/2010 Adler
8,033,212 B2 10/2011 Liu

* cited by examiner

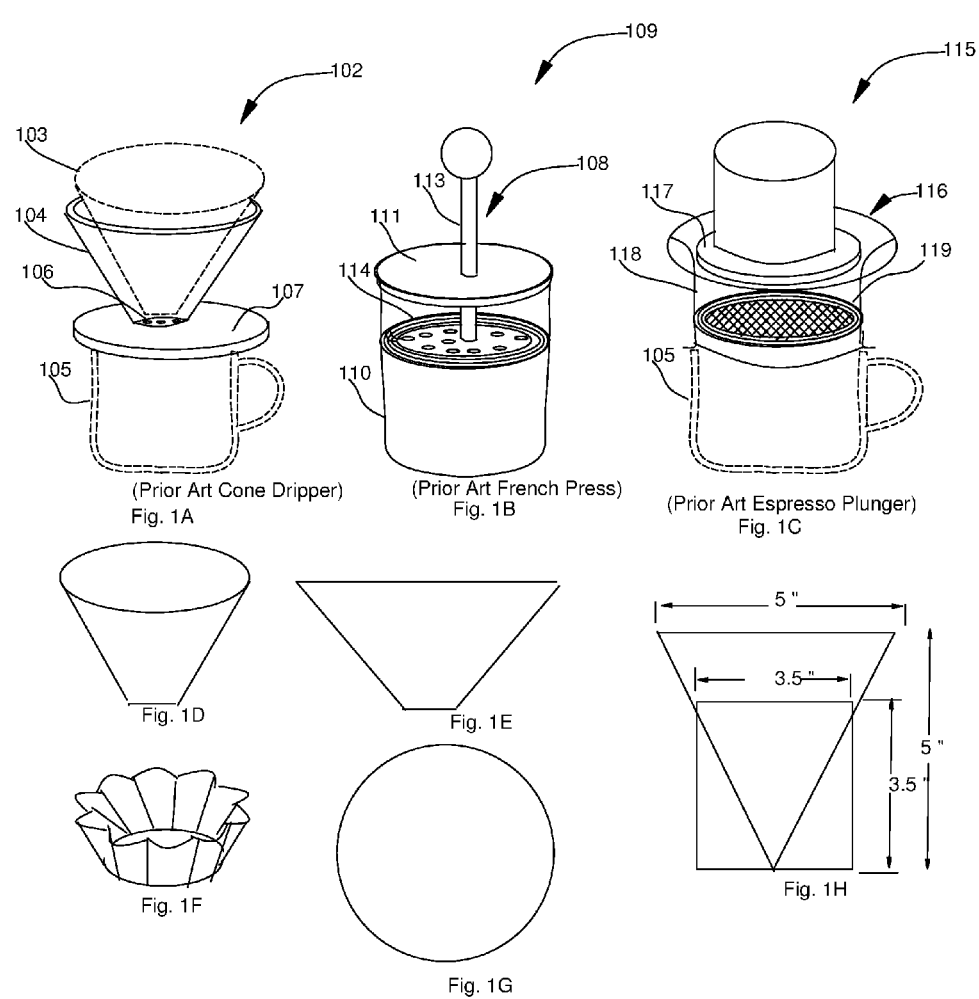

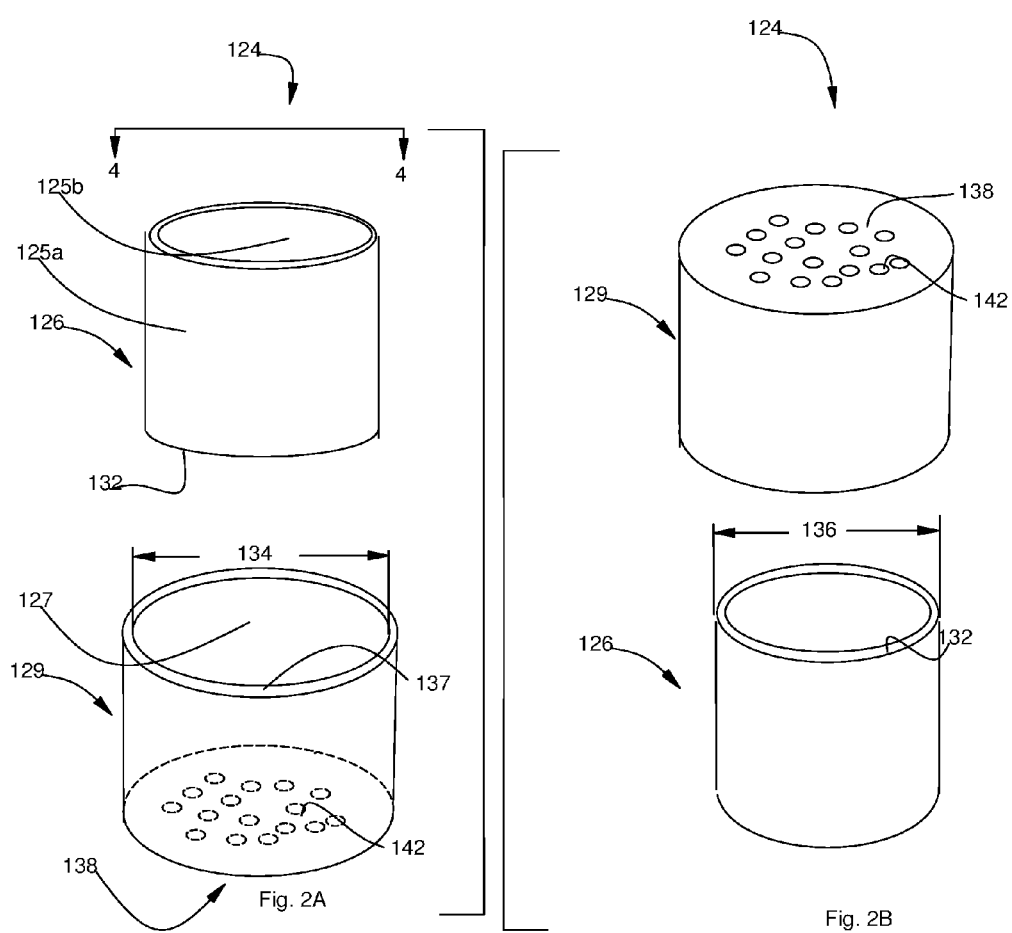

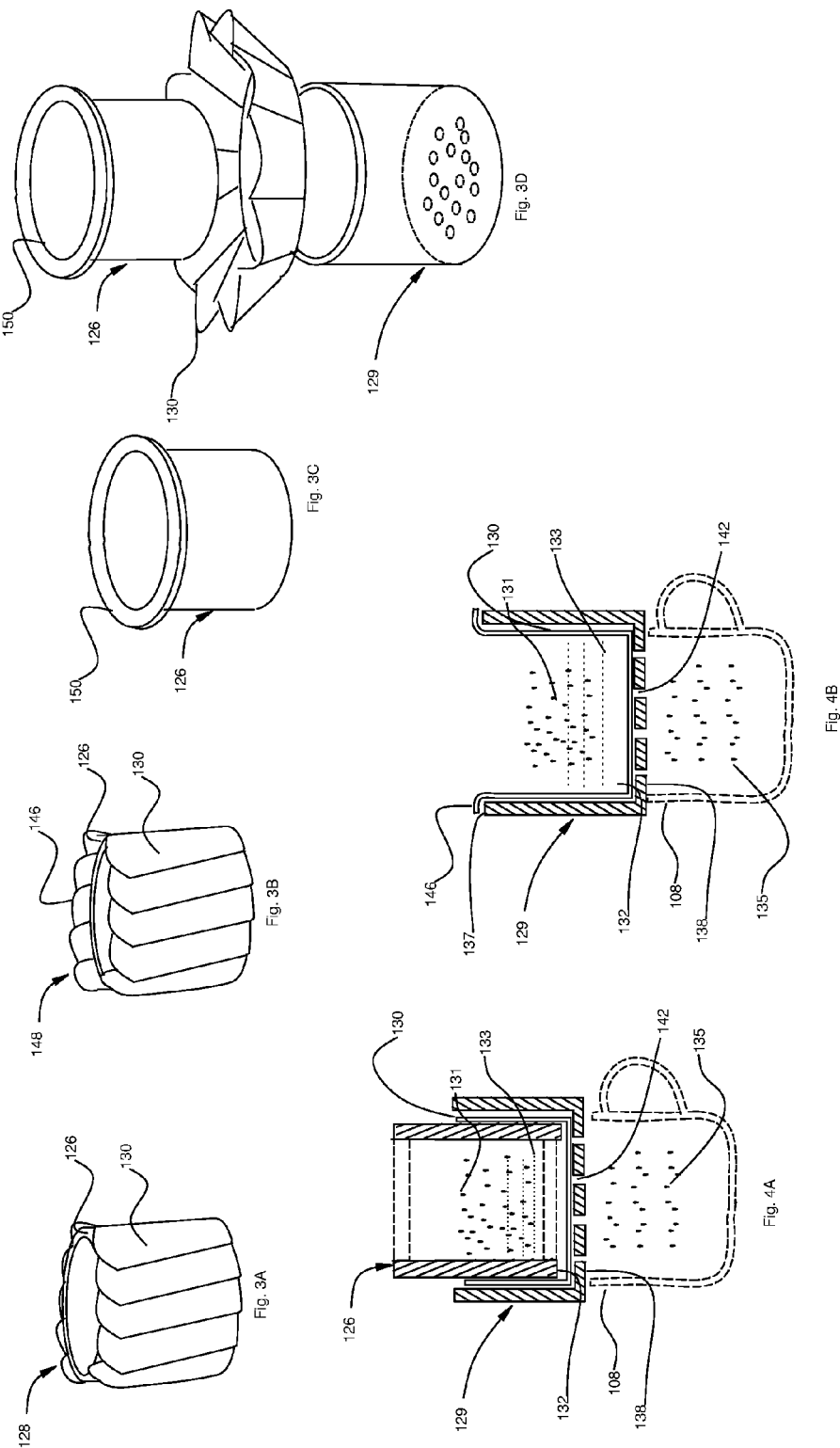

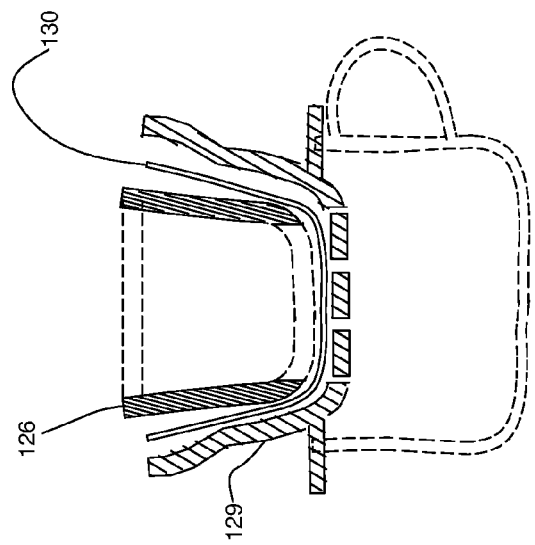
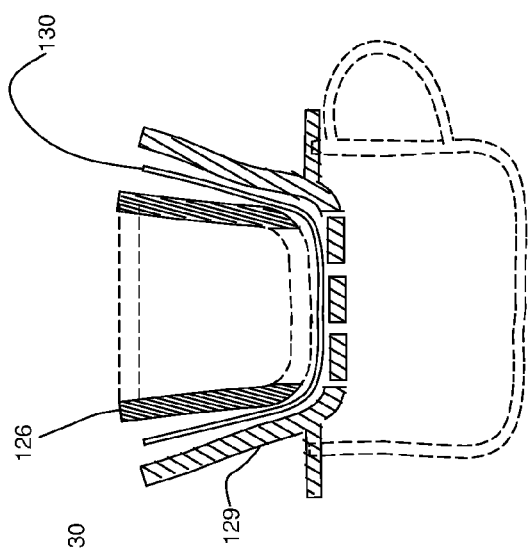
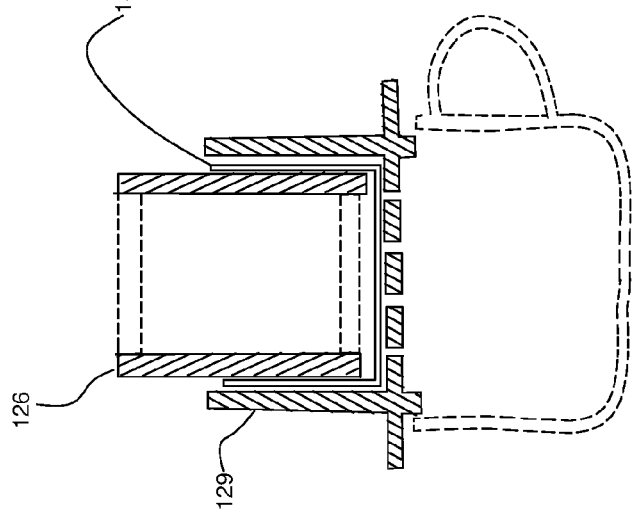

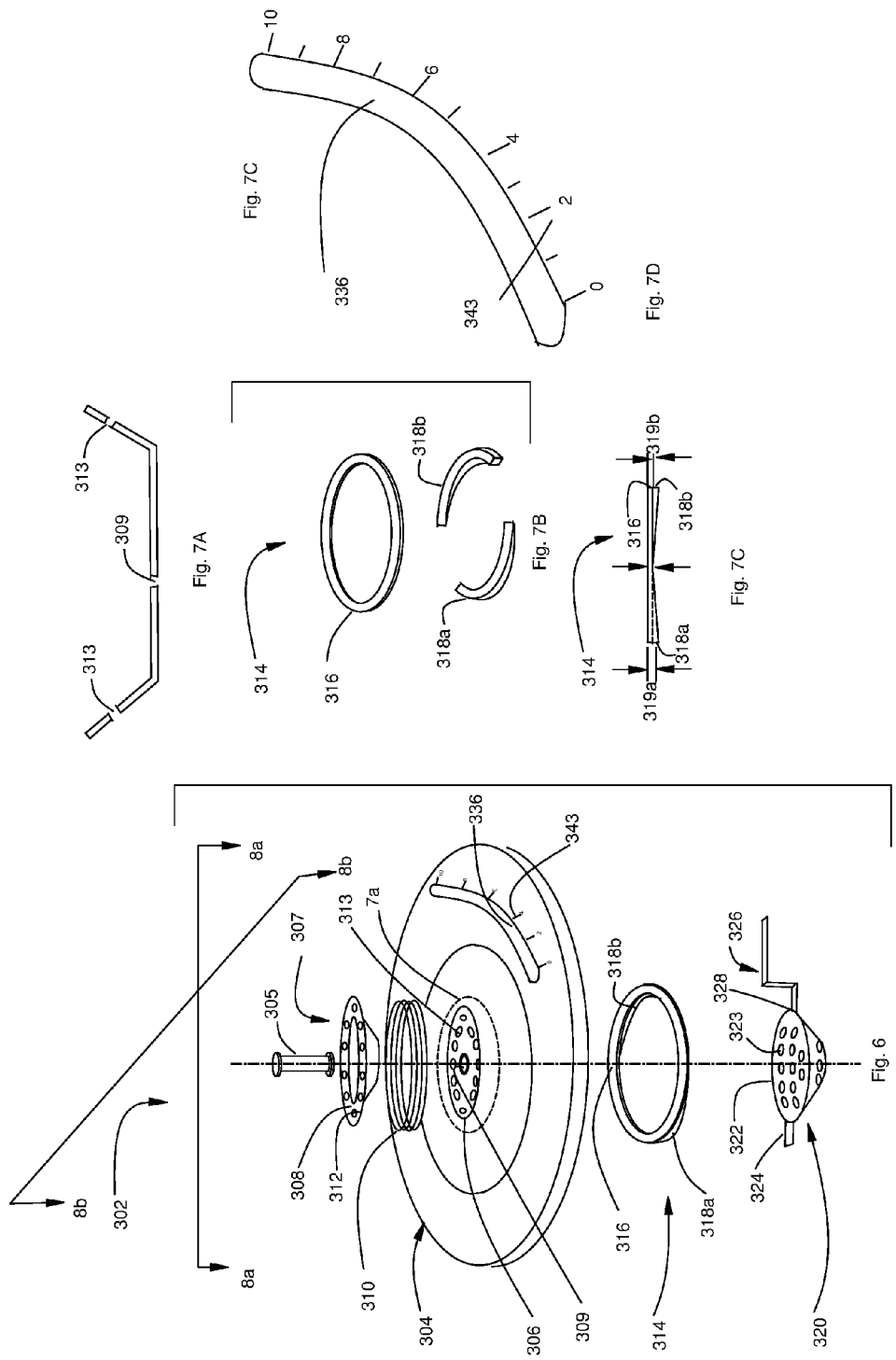

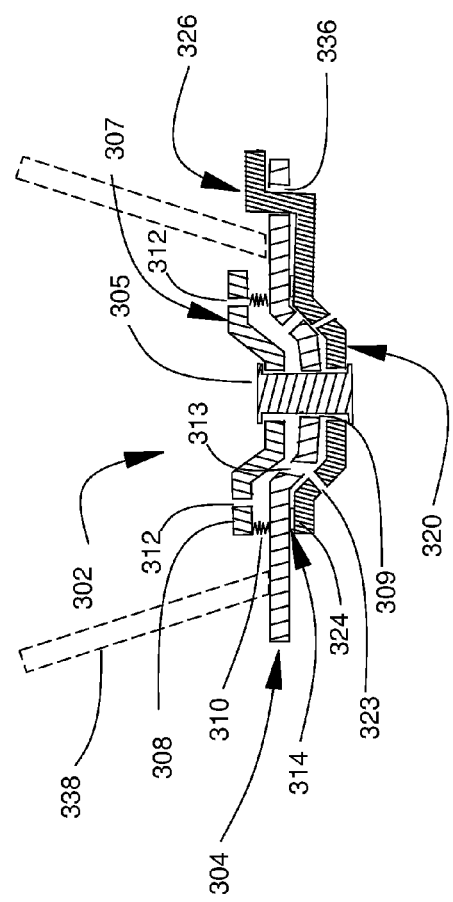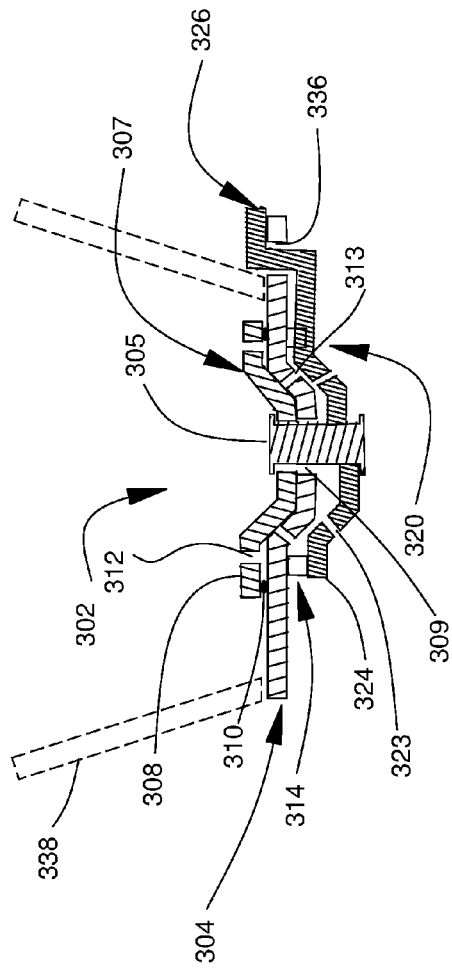

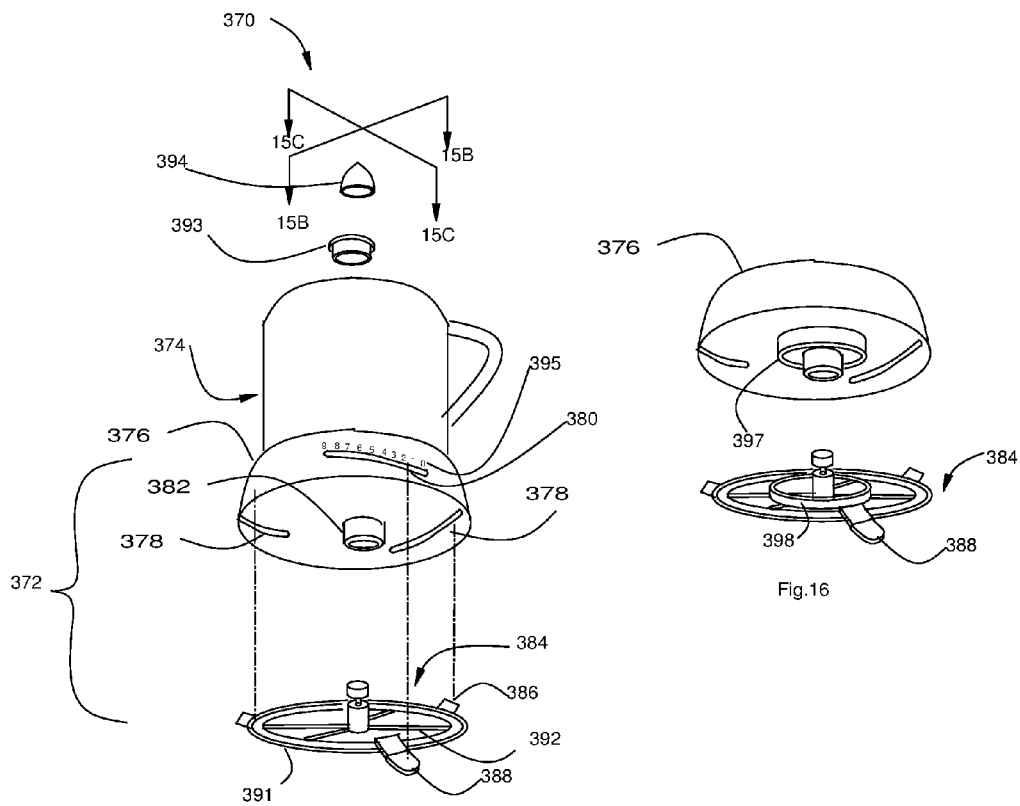
Fig. 15A
Fig.16
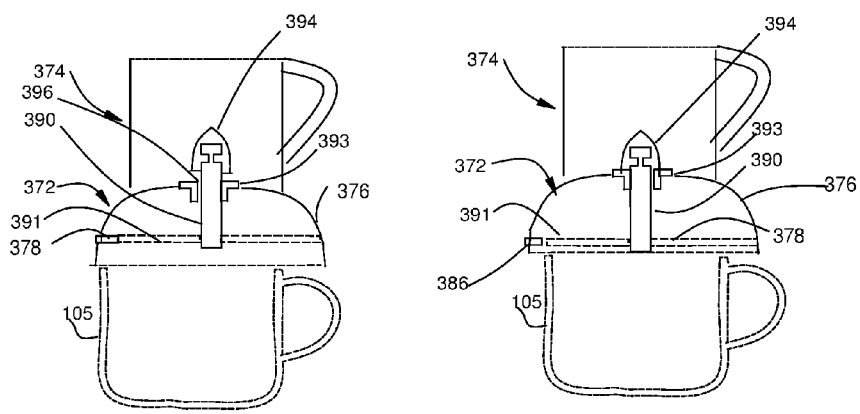
Fig. 15B
Fig. 15C

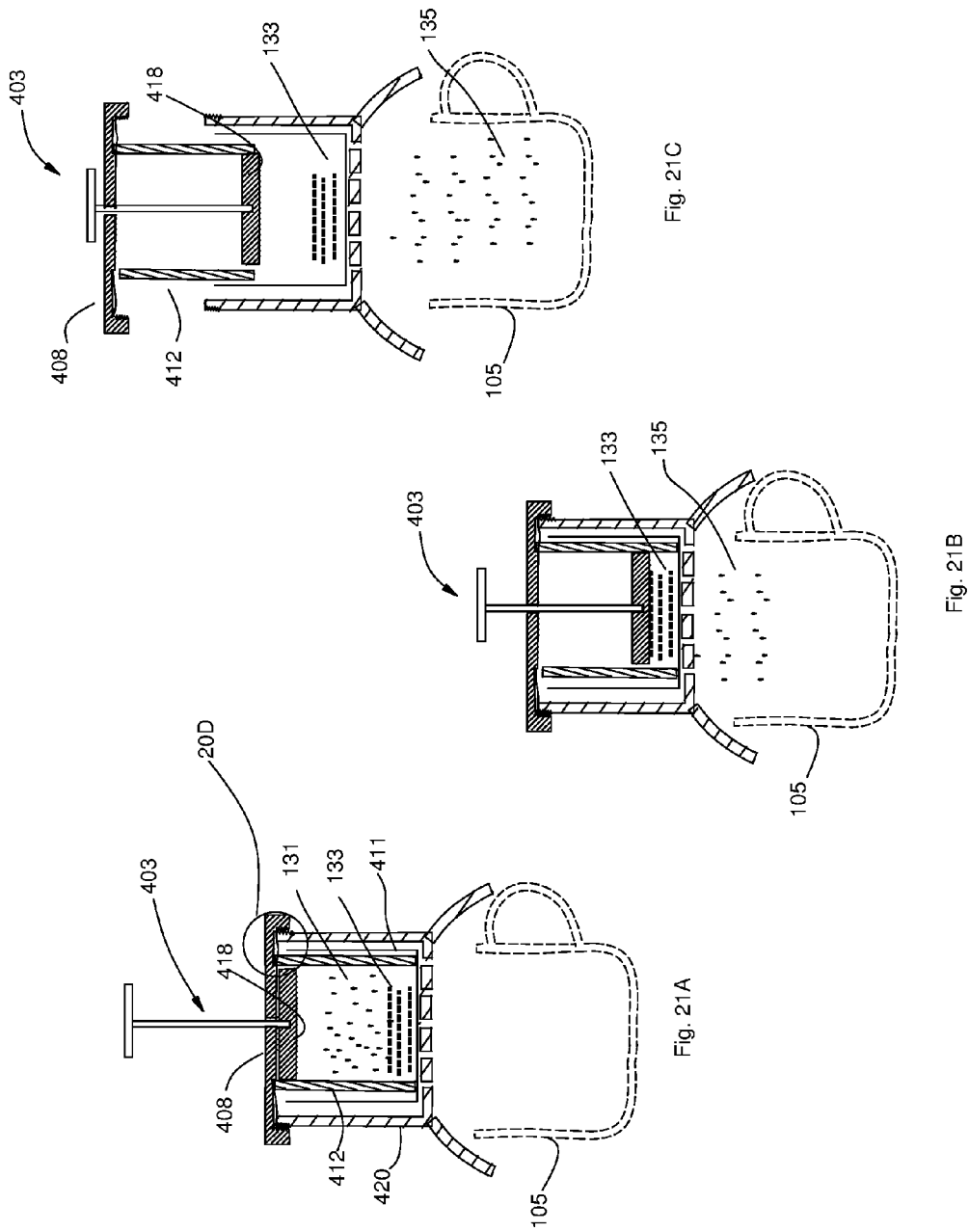

SINGLE CUP COFFEE AND TEA MANUAL BREWING SYSTEM

CROSS-REFERENCE TO RELATED APPLICATIONS

This application claims benefit of the U.S. patent application Ser. No. 14/542,566 filed Nov. 15, 2014 by the present inventor. This patent application is incorporated herein by reference. This application also claims the benefit of the U.S. Provisional Patent Application No. 62/319,140 filed Apr. 6, 2016 by the present inventor. This application also claims the benefit of the U.S. Provisional Patent Application No. 62/346,638 filed Jun. 7, 2016 by the present inventor. These provisional patent applications are also incorporated herein by reference.

BACKGROUND

There are three basic generic types of single cup coffee and tea brewers: the cone drippers that have a drip mode, the infusers that have an infusion (i.e. steep) mode, and the Espresso plungers that force brewed coffee through a filter.

FIG. 1A illustrates a cone dripper 102 using a Number 2 conical coffee filter 103. To use the cone dripper 102, the cone dripper 102 is placed on top of a coffee cup 105, the conical coffee filter 103 is inserted in the conical container 104, coffee grounds and hot water are then added to the conical coffee filter 103. The coffee brews in the filter paper and the brewed coffee slowly drips through the drainage holes 106 located on the cone dripper base 107. The time it takes for the brewed coffee to complete the dripping is herein called the drip time. The cone dripper typically has three drainage holes, and the rate of dripping, herein called the drip rate, depends largely on the diameter of the drainage holes. The advantage of the dripper is that it is cheap to produce and easy to use. However, there are several deficiencies of the generic cone dripper:

1) The user has no control of the drip rate;
2) there is no zero infusion mode, i.e. the time the water and coffee grounds steep before dripping starts; and
3) The size of the cone dripper is limited by the capacity of the conical filter used.

FIG. 1B illustrates the most common infuser type coffee brewer: The French press 109. It has a French press container 110, typically a glass or plastic beaker. It also has a French press plunger 108 constructed out of a handle 113 attached to the metallic filter 114 and slidingly attached to the French press lid 111.

The French press 109 makes brewed coffee as follows. The French press plunger component 108 is removed from the French press container 110, coffee grounds and hot water are then placed in the French press container 110, and the French press plunger component 108 is then inserted in the French press container 110 with the French press lid 111 removably attached on the top of French press container 110 with the metallic filter in an upward position as illustrated in FIG. 1B. The coffee grounds and hot water are allowed to steep for several minutes. Then the handle 113 is pushed down thereby compressing the coffee grounds to the bottom of the container while the brewed coffee without the grounds remain above the metallic filter 114. The brewed coffee is then poured into a cup for drinking.

There are several deficiencies of the generic French press:
1) some coffee grounds typically get in the brewed coffee after pressing is completed;
2) the grounds remaining in the French press container have to be disposed of; and
3) the press time (similar to the drip time of the dripper) gives the user very little control of the process.

FIG. 1C illustrates a generic version of the Espresso plunger assembly 115. It is constructed out of a plunger component 116 that has a plunger base 117 that snugly fits in the Espresso plunger container 118. Espresso plunger container 118 is open at the bottom. Attached to the bottom is an Espresso plunger filter 119. The Espresso plunger assembly 115 fits on a coffee cup 105 as illustrated in FIG. 1C To use the Espresso plunger assembly 115, the Espresso plunger container 118 with the plunger component 116 removed is seated on top of the coffee cup 105. Coffee grounds and hot water are added to the Espresso plunger container 118 and brewing starts. The plunger component 116 is then inserted in the top of the Espresso plunger container 118 and pushed down, the plunger base 117 forcing the brewing liquid through the Espresso plunger filter 119 into the coffee cup 105. The Espresso plunger filter 119 lets the brewed coffee pass through and fall into the cup, but is fine enough to prevent the coffee grounds to pass through. When the pressing is done, the coffee is ready to drink.

FIG. 1D illustrates an opened cone filter. FIG. 1E shows the flattened cone filter as sold commercially (typically a number of them are stacked, one on top of the other). FIG. 1F illustrates a basket filter in the shape it is sold commercially (typically a number of them are stacked, one inside the other). FIG. 1G shows the basket filter opened flat as a filter paper disk. FIG. 1H show cross sections of a cone and cylinder with dimensions as shown. Since the volume of a cone is ⅓ the area of the base multiplied by its height, and the volume of a cylinder is the area of the base multiplied by its height, FIG. 1H illustrates that the profile of a cylinder is much smaller than a cone with the same volume. Both cross sections have a volume of approximately 33 cubic inches.

a) There are several proprietary single cup coffee brewers. Five of the most popular are:
Clever™ Coffee Brewer (uses a Number 2 conical coffee filter) and its larger version, the NEW Clever Coffee Brewer (uses a Number 4 conical coffee filter). These are covered by U.S. Pat. No. 6,327,965.
b) Incred 'a Brew™ Coffee Maker: Also covered by U.S. Pat. No. 6,327,965. Uses a metal filter.
c) AeroPress™ Coffee Brewer (uses a proprietary filter paper). Covered by U.S. Pat. No. 7,849,784.
d) Bonavita BV4000ID Porcelain Immersion Coffee Dripper. (Uses a Number 4 conical coffee filter). Flow is turned on or off using a lever.
e) Frieling Coffee for One™: Has drip mode only, uses a metal filter The first four proprietary coffee brewers listed above all have an infusion mode, however only the AeroPress uses filter paper with a brewing container that has a flat bottom, and is the most popular commercial product implementing the Espresso plunger function. Furthermore, although the first four proprietary coffee brewers have an infusion mode and a drip mode, none can control the drip rate. The AeroPress proprietary coffee or tea brewer uses proprietary filter paper, comes with many parts, and many find it difficult to use.

SUMMARY OF THE DISCLOSURE

Various embodiments of the single cup coffee brewer presented herein are constructed out of a drip component, a drip rate control component, and a plunger assembly. The drip component has a cylindrical container with a base having drainage holes, and a cylindrical tube that fits inside the cylindrical container with just enough clearance so the following occurs: When a basket filter paper sheet of appropriate size is centrally placed on top of the cylindrical container, and the cylindrical tube is then pressed down on the filter paper sheet, then the cylindrical tube pushes basket filter paper sheet into the cylindrical tube snugly. If the cylindrical tube is then removed, the filter paper forms a filter fitting snugly in the cylindrical container.

The second component is a drip rate control component that is attached to the bottom of the drip component and is used to control the rate of drainage flow (i.e. drip rate) from the drip component. The drip rate control component has a lever that rotates between zero and 90 degrees along an axis perpendicular to the longitudinal axis of the drip component. When the lever is set at zero degrees, no dipping is allowed. When set at 90 degrees, the maximum drip rate occurs. As the lever is positioned between zero and 90 degrees the drip rate is determined by the angle; the greater the angle the greater the drip rate. The drip rate control component is typically calibrated in embodiment so that the drip rate has a drip time that may be varied between 0 and four minutes.

The plunger assembly is constructed from a plunger component and a brewing cup component that allows the single cup coffee brewer to add an Espresso capability to the brewer. In this mode, the cylindrical tube is not removed after the filter paper sheet is installed, and the plunger uses the cylindrical tube as a chamber to push the brewing coffee through.

By appropriate design of the single cup coffee brewer as described in the detailed description, a large number of brewing options are available to a user. To give just a few of the many examples, the coffee brewer can be used in the following ways:
1) as a dripper with a user setting drip time of four minutes,
2) as an infuser with a user setting infuser time of four minutes followed by dripping with drip time of 30 seconds,
3) as an infuser with a user setting the infusion time of two minutes followed by the user setting drip time of two minutes, and
4) as an Espresso brewer.

In all these examples, after brewing is complete, a user can easily dispose of the paper filter containing the coffee grounds.

BRIEF DESCRIPTION OF THE DRAWINGS

FIG. 1A is a prior art generic cone dripper.
FIG. 1B is a prior art generic French press.
FIG. 1C is a prior art generic Espresso plunger.
FIGS. 1D through 1G illustrate perspective views and commercial packaging views of the cone filter and the basket filter.
FIG. 1H illustrates the profiles of the cone and a cylinder having approximately the same volume.
FIGS. 2A and 2B are front top and front bottom perspective views of a first embodiment of the dripper component of the present invention.
FIGS. 3A and 3B are perspective views of a wrapped tube of the first embodiment and an alternate embodiment of the dripper component of the present invention.
FIG. 3C is a perspective view of an alternate embodiment of the cylindrical tube having a tube top lip.
FIG. 3D shows the cylindrical tub with the tube top lip about to construct a wrapped tube.
FIGS. 4A and 4B are sectional views of FIGS. 3A and 3B respectively shown sitting on a coffee cup.
FIGS. 5A through 5C are sectional views illustrating three possible shapes for the brewing container and cylindrical tube. The three brewing containers are examples having substantially cylindrical shapes.
FIG. 6 illustrates an exploded view of the first embodiment of the drip rate control component of the present invention.
FIG. 7A illustrates a sectional view of a portion of the cylindrical base of the first embodiment of the drip rate control component in an expanded scale.
FIG. 7B illustrates an exploded view of the wedge part of the first embodiment of the drip rate control component of the present invention shown in FIG. 6.
FIG. 7C illustrates a side view of the wedge part of the first embodiment of the drip rate control component of FIG. 6.
FIG. 7D illustrates a perspective view of the curved slot and tick marks of FIG. 6 shown in an expanded scale.
FIGS. 8A and 8B are sectional views of the first embodiment of the drip rate control component in an open and closed position respectively; the sections taken are indicated in FIG. 6.
FIG. 15A illustrates a perspective exploded view of an alternate embodiment of the single cup coffee brewer that combines the drip component with the drip rate component.
FIGS. 15B and 15C illustrate two sectional views of FIG. 15A when the drip rate component is open and closed respectively.
FIG. 16 illustrates an alternate embodiment to FIG. 15A.

FIGS. 21A through 21C illustrate the use of the fourth embodiment in using the plunger component in making Expresso type coffee.

DETAILED DESCRIPTION OF THE DISCLOSURE

Figure 9:
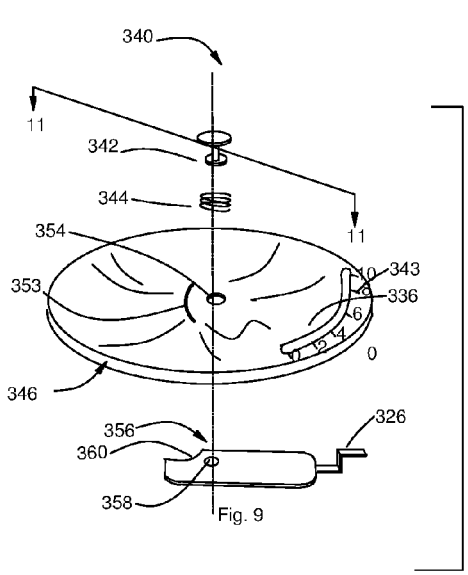
FIG. 9 illustrates an exploded perspective view of a second embodiment of the drip rate control component of the present invention.

In the following detailed description and the appended claims, the term shaped filter refers to filters that are either cone filters shown in FIGS. 1D and 1E or basket filters as shown in FIGS. 1F and 1G. A basket filter is made from a flat circular sheet and can be flattened easily when it is removed from its commercial packaging. The diameter of a basket filter is its diameter when flattened. A drip rate of zero means the container does not drip. The term liquid refers to heated water or the liquid in brewed coffee or tea. Although the embodiments presented in this detailed description refer to coffee, the detailed description applies equally well to tea, where coffee grounds are replaced by tea leaves, flakes or a similar product. Terms like bottom, top, clockwise and counterclockwise refer to the figure they are referenced to.

The inventive concept presented herein presents an innovative single cup coffee brewer that is constructed out of a dripper component, a drip rate control component and an Espresso plunger assembly.

Dripper Component

FIG. 2A illustrates an exploded perspective frontal top view of a first embodiment of the dripper component 124. FIG. 2B illustrates an exploded perspective frontal bottom view of the first embodiment. Referring to FIGS. 2A and 2B as shown, the dripper component 124 is constructed out of two parts; a cylindrical tube 126 having a tube bottom rim 132, and a brewing container 129 having a cylindrical shape such that its brewing container cylindrical interior 127 fits over the tube exterior surface 125a of the cylindrical tube 126 with enough clearance to accommodate the wrapped tube 128 as indicated in FIGS. 3A and 4A. Referring to FIG. 2A as shown, brewing container 129 has a brewing container bottom drainage part 138 having drainage holes 142, and a brewing container interior diameter 134 that is slightly larger than the cylindrical tube exterior diameter 136. The cylindrical tube 126 has a tube exterior surface 125a and a tube interior surface 125b.

FIG. 3A illustrates the wrapped tube 128 constructed by wrapping the cylindrical tube 126 with Number 4 paper filter 130. FIG. 4A illustrates a sectional view of the dripper component 124 obtained by cutting along the line 4-4 shown in FIG. 2A. As shown in FIG. 4A, the wrapped tube 128 sits on a coffee cup 105, and heated water 131 and coffee grounds 133 has been added to the wrapped tube 128. Note that the paper filter 130 and the coffee cup 105 are not part of the dripper component 124.

The dipper component parts are sized, configured and constructed such that when the paper filter 130 is wrapped tightly around the tube exterior surface 125a and tube bottom rim 132, there is the just the right amount of clearance so that when the cylindrical tube 126 is inserted inside the brewing container 129, the paper filter 130 is held snugly in place.

FIGS. 3A and 4A illustrate the preparation of the dripper component 124 for use. Specifically, to use the dripper component, the user wraps the filter paper around the cylindrical tube 126 forming the wrapped tube 128 which is then placed inside the brewing container 129. The user then adds heated water 131 and coffee grounds 133 to the brewing container 129. The brewed coffee 135 then slowly drips through the bottom of the coffee filter, through the drainage holes 142, and into the coffee cup 105, while the paper filter 130 keeps the coffee grounds in the wrapped tube 128. When dripping is complete, the user removes the wrapped tube 128 from the coffee cup 105, and can easily dispose of the paper filter with the coffee grounds into the trash after removing it from the cylindrical tube 126. Any residual coffee grounds remaining on the cylindrical tube 126 can then be removed using a butter knife or spoon. The brewed coffee in the coffee cup 105 is ready for drinking FIGS. 3B and 4B illustrate an alternate embodiment to the dripper component 124. The same parts used in FIGS. 3A and 3B are used in FIGS. 4A and 4B. However, a paper filter 130 of a larger size is used. When this filter paper is wrapped around the cylindrical tube 126 forming the wrapped tube 128, the paper filter outer annular ring 146 overhangs the brewing container top rim 137 as shown in FIG. 4B. To create this alternate embodiment, the basket paper filter 127 is centrally positioned on top of the brewing container 129, the cylindrical tube 126 is placed centrally over the basket paper filter 127 and then pushed down, forcing the basket paper filter 127 into the brewing container 129 so that the central portion of the basket paper filter 127 lies snugly against the brewing container bottom drainage part 138. The paper filter outer annular ring 146 is then manually forced to overhang the brewing container top rim 137. The cylindrical tube 126 is then removed, leaving the paper filter 130 fitting snugly inside the brewing container 129 with the paper filter outer annular ring 146 overhanging the brewing container top rim 137 as shown in FIG. 4B.

The size of the filter paper depends on the dimensions of the dripper. Two examples of standard filter papers readily available commercially are: Number 6 filter paper having a flattened diameter of eight inches, and filter papers used by 12 cup commercial coffee brewers having a flattened diameter of nine and one half inches. As an example, if a brewing container 129 has an inside diameter 3 inches and a height of 3¼ inches, then a basket paper filter 127 with diameter of 9½ inches will just fit in the brewing container 129; hence the brewing container 129 can accommodate this size of basket paper filter 127. If the brewing container 129 is slightly smaller, then the 9½-inch basket filter paper can be used with overhang as in FIG. 4B. These dimensions of the brewing container 129 will provide a liquid volume similar to the volume of a number 4 cone filter, but with a much smaller profile as indicated in FIG. 1H.

FIG. 3C illustrates another alternate embodiment of the dripper component 124. In this embodiment, a tube top lip 150 is added to the cylindrical tube 126 as shown in FIG. 3c. The tube top lip 150 will facilitate the basket paper filter to overhang the brewing container top rim 137 of the brewing container 129 when installed.

FIG. 3D illustrate another alternate method for creating the wrapped tube as shown in FIG. 4B. The paper filter 130 is placed and centered over the brewing container 129. The cylindrical tube 126 with tube top lip 150 is then placed over the paper filter 130, centering it as shown in the FIG. 3D, and then pushed down, forcing the paper filter 130 down into the brewing container 129 until the paper filter 130 is pressed against the bottom of the brewing container 129. The paper filter 130 will then take the shape as shown in FIG. 4B, with the paper filter outer annular ring 146 forced over the brewing container top rim 137 of the brewing container 129 by the tube top lip 150.

It is noted that if paper filter 130 is available commercially with an already folded shape such as indicated in FIG. 3B, then the cylindrical tube 126 is not required. The basket paper filter 127 may be inserted directly into the brewing container 129. This provides another alternate embodiment that includes the basket paper filter 127 as part of the alternate embodiment, and eliminates the cylindrical tube 126 in this alternate embodiment.

FIGS. 5A through 5C illustrate additional alternate embodiments that are consistent with teachings of the present invention. FIG. 5A shows a cross section indicating regular hollow cylinders used for the cylindrical tube 126 and brewing container 129. This corresponds to the embodiments discussed above. FIGS. 5B and 5C illustrated different designs where the brewing container 129 and the cylindrical tube 126 have a substantially cylindrical shape. Finally, it is noted that in all the embodiments presented herein, a cap may be included to fit over the tops of either the cylindrical tube 126 or the brewing container 129. Further alternate embodiments may be constructed that are consistent with the teachings of the present invention.

Drip Rate Control Component

FIG. 6 illustrates a first drip rate control component 302 according to the teachings of the present invention. As shown, the first drip rate control component 302 comprises a pin 305, an upper drainage part 307 having a drainage lip 308, upper drainage holes 312, a spring 310, a cylindrical base 304, a wedge part 314 constructed out of a ring part 316 and two lower wedge pieces, the left lower wedge piece 318a and the right lower wedge piece 318b that are attached to the ring part 316, and a lower drainage part 320.

Again referring to FIG. 6, the cylindrical base 304 has the shape of a circular disk that has a curved slot 336 positioned near the outer circumference of the cylindrical base 304, and has a concave up circular depression 306 concentric with the cylindrical base 304. The concave up circular depression 306 has a cylindrical hole 309 centrally located inside and concentric with the concave up circular depression 306.

FIG. 7A illustrated a sectional view of a portion of the cylindrical base 304 in expanded scale produced by cutting along the lines 8a-8a of FIG. 6 and by the dashed circle indicated by 7a. FIG. 7B illustrates an exploded view of the wedge part 314. FIG. 7C illustrates a side view of the wedge part 314. As shown in these three figures, the left lower wedge piece 318a and right lower wedge piece 318b have the shape of circular arc-shaped wedges that have two opposing tapers. The thickest part of the wedge part 314 has maximum thickness 319a at the left side and right side of wedge part 314 as shown. Similarly, the thinnest part of the wedge part 314 has minimum thickness 319b at the middle of the wedge part 314 as shown.

Again referring to FIG. 6 as shown, lower drainage part 320 has a lower drainage piece 322 having lower drainage holes 323, a lever 326 attached to the outer rim 328 of lower drainage piece 322 and a left tab 324 attached to outer rim 328 of lower drainage piece 322 opposite the attachment point of where lever 326 is attached. The pin 305 passes through the cylindrical hole 309, and permanently rotationally attaches the upper drainage part 307 to the lower drainage part 320. This allows the lower drainage part 320 to rotate relative to the cylindrical base 304. With this construction, the upper drainage part 307 slides vertically relative to cylindrical base 304 and also slides vertically relative to the lower drainage part 320. The lower drainage part 320 is rotationally connected to the cylindrical base 304.

FIGS. 8A and 8B are sectional views of the first drip rate control component 302; the sections taken along the lines 8a-8a and 8b-8b as indicated in FIG. 6. A generic cylindrically shaped brewing container 338 has been added to the drip rate control component. The generic cylindrically shaped brewing container 338 is not part of the first drip rate control component 302. The 8a-8a section is configured so flow is open to the maximum extent, and the 8b-8b section is configured so that flow is stopped completely in the first drip rate control component 302.

The lever 326 is shaped as shown in FIG. 6. Referring to FIG. 6, FIG. 8A and FIG. 8B the lever 326 fits through the curved slot 336, and can be moved by a user from 0 to 90 degrees through the slot as the lower drainage part 320 rotates. When positioned at 0 degrees (FIG. 8B) the first drip rate control component 302 is closed and when positioned at 90 degrees (FIG. 8A) the first drip rate control component 302 is completely open. As shown in FIG. 6, indicia in the form of number tick marks 343 located on top of the cylindrical base 304 near the curved slot 336 are used to indicate to the user the relative drip rate of fluid flowing through the first drip rate control component 302 using the tick mark flow-numerals labeled 0 to 10, where 0 indicates the unit is closed preventing fluid flow, and 10 indicating fluid can flow to the maximum extent.

In FIG. 8A, the first drip rate control component 302 is an open position. At that time, the lever 326 is set at the furthest counterclockwise positive (see FIG. 6) corresponding to the tick mark 10. (FIG. 7D illustrates the curved slot 336 and the tick marks 343 in an expanded scale.) In this open position, the upper drainage part 307 is raised by the spring 310, where the left tab 324 and the bottom part of the lever 326 are positioned toward the center of the wedge part 314 at the thinnest part of the left lower wedge pieces 318a and the right lower wedge piece 318b. Liquid flows through the upper drainage holes 312, through the base drainage holes 313, and through the lower drainage holes 323 located on the lower drainage piece 322.

In FIG. 8B, the lever is positioned so that the first drip rate control component 302 is closed. At that time, the lever 326 is positioned in a furthest clockwise position corresponding to the tick mark 0. The upper drainage part 307 is lowered by the wedge part 314, where the left tab 324 and the bottom of the lever 326 are pushed down by the wedge part 314 at its thickest vertical location. When so positioned, water does not flow through the upper drainage holes 312 since the conical portion of the upper drainage part 307 is pressed firmly against the conical portion of the cylindrical base 304. As discussed, the parts of the first drip rate control component 302 are configured so this system works as described.

Figure 11:
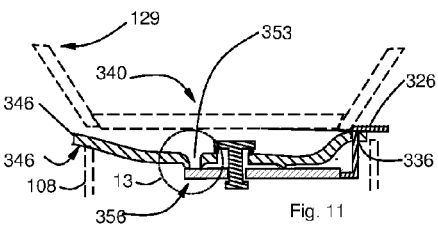
FIG. 11 is a cross section of the second embodiment of the drip rate control component when assembled, the cross section indicated in FIG. 9.

FIG. 9 illustrates an exploded perspective view of a second embodiment of the drip rate control component: the second drip rate control component 340. FIG. 11 is a sectional view of the second drip rate control component 340 when assembled; the cross section indicted in FIG. 9 by the lines 11-11. The second drip rate control component 340 is designed to work with a generic coffee brewer such as a generic cylindrically shaped brewing container 338 (see FIG. 10A), a generic cone dripper 338a (see FIG. 10B), or the dripper component 124 of the teachings of the present invention (see FIG. 2A). The second drip rate control component 340 is constructed of a bolt 342, a spring 344, a top circular disk 346 having a top circular hole 354 concentric with the top circular disk 346, a curved slot 336 with tick marks 343 and a drainage opening 353 shaped as a curved slit. (The curved slot 336 and tick marks 343 are the same as shown in FIG. 7S). Also included is a drip rate control bottom part 356 having a bottom circular hole 358, and a cutout 360 in one corner as shown. A lever 326 is attached to drip rate control bottom part 356 at the opposite end of the cutout 360. The top circular disk 346 is concave up. It has a curved cross section as shown in FIG. 11 constructed so that liquid will flow towards the drainage opening 353. The drip rate control bottom part 356 is constructed so that when assembled as indicated in FIG. 11, the drip rate control bottom part 356 will rotate around the bottom circular hole 358 in a manner that controls the drip rate. The second drip rate control component 340 is configured so that the lever 326 fits through the curved slot 336. Although not shown in FIG. 9 and FIG. 11, a brewing container 129 may be attached to second drip rate control component 340, either permanently, or removably by threads or other means.

Figures 10A, 10B:
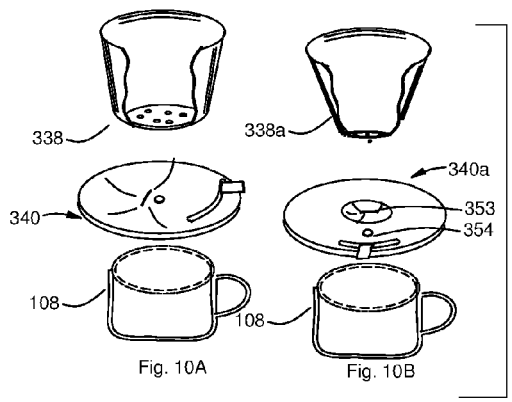
FIG. 10A is a perspective view of the second embodiment of the drip rate control component used with a cylindrical brewing container positioned on a coffee cup.
FIG. 10B is a perspective view of the second embodiment of the drip rate control component used with a cone dripper brewing container positioned on a coffee cup.

FIG. 10A is an exploded perspective view of a generic cylindrically shaped brewing container 338 about to be attached to second drip rate control component 340 positioned above a coffee cup 105. FIG. 10B illustrates a generic cone dripper 338a having a cone shape, as used in commercial cone drippers. For the generic cone dripper 338a, the second drip rate control component 340 is changed to a modified second drip rate control component 340a. This modification has the drainage opening 353 placed in the center of the drip rate control component, and the bolt 342 is moved off-center so the lever 326 can pivot to control the drip rate.

The spring 344 of second drip rate control component 340 serves two purposes. In normal use, it keeps the drip rate control bottom part 356 pressed against the top circular disk 346. When cleaning the coffee brewer, it allows the drip rate control bottom part 356 to be pulled away from the top circular disk 346 for cleaning.

Figure 12A:
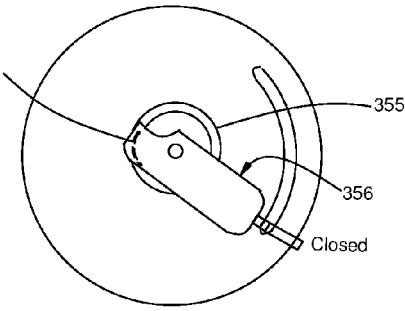
FIGS. 12A, 12B and 12C indicate the lever positioned in a 0-degree angle, a 45-degree angle and a 90-degree angle respectively.
Figure 12B:
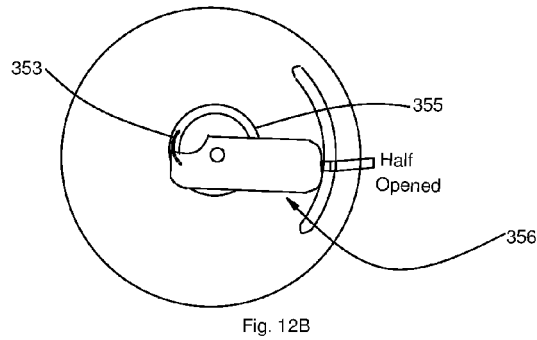
Figure 13:
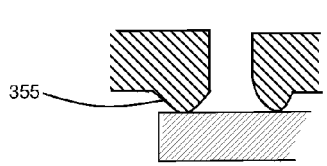
FIG. 13 illustrated a detail of FIG. 11, the detail indicated by the circle marked 11.
Figure 12C:
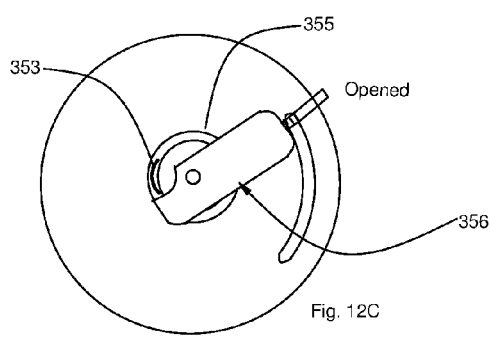

Referring to FIG. 12A, FIG. 12B and FIG. 12C, as the lever 326 is moved in increments the drainage opening 353 and cutout 360 allow the drip rate to vary. For a specific container, the container, drainage opening 353 and drip rate control bottom part 356 are configured so that it has a drip time between 0 and a maximum time depending upon the position of the lever 326. Hence the second drip rate control component 340 provides the container with drip rate control. The actual drip rate of course depends on many factors, including but not limited to the amount of liquid to be dripped, the coarseness of the grounds, and the temperature of the liquid. In a commercial product maximum drip time will typically be set at four to eight minutes, with the drip rate empirically set to achieve this goal, FIG. 13 illustrates in expanded scale a detail of FIG. 11 showing a protuberance 355 located on the bottom portion of the drainage opening 353. The protuberance 355 is a raised ring that is constructed to allow the bottom part to move smoothly over the drainage opening 353. The protuberance is also shown in FIGS. 12A through 12C.

Figures 14A, 14B:
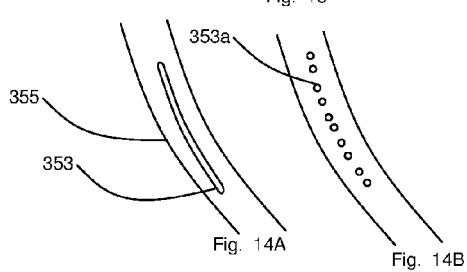
FIG. 14A illustrates the protuberance and the drainage opening in an expanded scale.
FIG. 14B illustrates an alternate version of the drainage opening, where the slit that forms the drainage opening 353 is replaced by ten small circular holes.

FIG. 14A illustrates a top view of the protuberance 355 and the drainage opening 353 in an expanded scale. FIG. 14B illustrates an alternate version of the drainage opening 353, where the curved slit that forms the drainage opening 353 is replaced by ten uniformly spaced drainage holes 353a. Each drainage hole corresponds to a tick on the top circular disk.

In alternate embodiments of the second drip rate control component 340, there may be more than one drainage opening 353 and cutout 360, and different designs for the drainage opening 353 implementations.

FIG. 15A illustrates a third embodiment of a single cup coffee brewer 370 with the drip rate control component 372 that is integrated with the brewing container 374. FIGS. 15B and 15C illustrate two sectional views of FIG. 15A where the single cup coffee brewer is assembled and the drip rate control component 372 is open and closed respectively. The drip rate control component 372 has a base part 376 with two tab slots 378, a lever slot 380 and cylindrical hollow receptacle 382. It also has an actuator part 384 with the two tabs 386, a lever 388 and a notched post 390. The actuator part has a circular actuator ring 391, with the two tabs 386 mounted on the circular actuator ring 391. Four struts 392 attach the circular actuator ring 391 to the cylindrical hollow receptacle 382. As indicated in FIG. 15A, also included is a rubber receptacle 393 and a rubber plug 394. Also included are flow-numerals 395 from 0 to 9 positioned on the base part 376 above the lever slot 380. The cross sections 15B-15B and 15C-15C are taken such that the flow rate is at the maximum rate and zero rate respectively.

The third embodiment is constructed as follows. Referring to FIGS. 15A, 15B and 15C, the two tabs 386 extrude radially outwards from the circular actuator ring 391 of the actuator part 384 and fit into the two tab slots 378 of the drip rate control component 372. The lever 388 fits through the lever slot 380. The rubber receptacle 393 fits through a base hole 396 located on top of the drip rate control component 372, and is designed to prevent liquid from flowing through the base part 376 except through the base hole 396. The notched post 390 fits through the rubber receptacle 393 and is capped securely by the rubber plug 394. The actuator part 384, when installed on the single cup coffee brewer 370, rotates between the zero value and 9 value of the flow-numerals 395.

The third embodiment functions as follows: The lever slot 380 and the two tab slots 378 are tilted relative to the bottom plane of the base part 376. When the lever 388 is rotated counterclockwise so the lever lies at the number 9 of the flow-numerals 395, the notched post 390 is raised and the rubber plug 394 is therefore also raised relative to the rubber receptacle 393. This allows brewed coffee to flow through freely, i.e. having a maximum flow rate. The spaces between the struts 392 and the circular actuator ring 391 allow the brewed coffee to flow freely into the coffee cup 105. If the lever 388 is rotated clockwise so the lever lies at the 0 value of the flow-numerals 395, the notched post 390 is lowered and the rubber plug 394 is also lowered and is seated tightly on the rubber receptacle 393, thereby preventing the brewed coffee from flowing. When the lever 388 is positioned between the flow-numerals from 0 to 9, the flow rate lies between the maximum flow rate and the zero flow rate; the greater the flow-numeral value, the greater the flow rate. The empty space between the struts 392 allows the brewed coffee to flow into a coffee cup 105.

FIG. 16 illustrates an alternate embodiment of the third embodiment. The main difference between this alternate embodiment and the third embodiment is that the alternate embodiment has an inner guide ring 397 and an outer guide ring 398 to make the actuator part 384 rotate easier.

It is observed that in the third embodiment, the raising and lowering of the actuator part 384, and hence the flow rate, is independent of gravity. An alternate way to implement the actuator part 384, without using the two tab slots 378, is to put matching threads in the inner guide ring 397 and the outer guide ring 398. The pitch of the matching threads will be determined so that the actuator is raised as the lever goes from flow-numeral 0 to flow-numeral 9.

Figure 17:
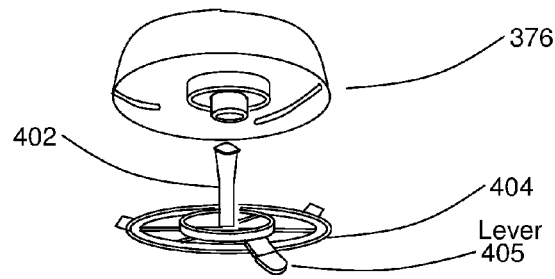
FIG. 17 illustrates a fourth embodiment of the current invention in an exploded perspective that uses a shaped post instead of the rubber receptacle and notched post of the third embodiment.

FIG. 17 illustrates another alternate embodiment of the third embodiment, which we call the fourth embodiment. The primary difference between this embodiment and the third embodiment is that the rubber plug 394 and the notched post 390 of the third embodiment is replaced by a shaped post 402 as illustrated in FIG. 17. The shaped post 402 is designed to control the flow rate in a more accurately controlled fashion. Table 1: Flow Rates indicates an example of possible flow rate as a function of the position of the lever 388 as it is positioned between the flow-numerals from 0 to 9.

TABLE 1

Flow Rates

| Flow-Numeral | Time (Minutes) |
|---|---|
| 0 | closed |
| 1 | 6 |
| 2 | 5 |
| 3 | 4 |
| 4 | 3.5 |
| 5 | 3 |
| 6 | 2.5 |
| 7 | 2 |
| 8 | 1 |
| 9 | 0.5 |

Figures 18A, 18B:
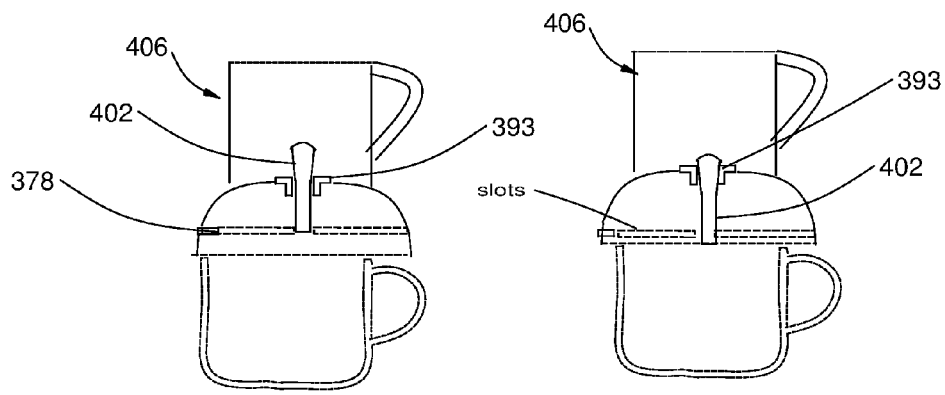
FIGS. 18A and 18B illustrates two sectional views of the fourth embodiment with the flow rate control mechanism in an open and closed configuration respectively.

FIGS. 18A and 18B illustrate how the fourth embodiment works as the lever 405 is rotated. When the lever 405 is rotated to flow-numeral 9 (FIG. 18A) the shaped post 402 is raised and liquid flows freely. When the lever 405 is rotated to flow-numeral 0 (FIG. 18B) the shaped post 402 is lowered and liquid stops flowing.

Figure 19A:
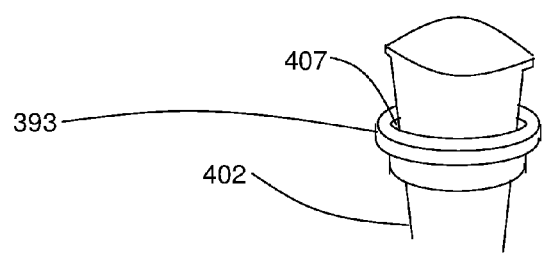
FIGS. 19A and 19B are two perspective views of the shaped post and rubber receptacle that illustrate how the desired flow rates may be determined.
Figure 19B:
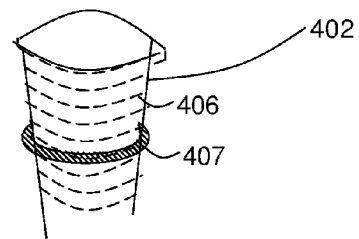

FIGS. 19A and 19B illustrate how the desired flow rates given in Table 1 may be determined. As the rubber receptacle 393 is moved up and down, the area of the annular ring 407 between the rubber receptacle 393 and the shaped post 402 changes. The flow rate of the brewer will be roughly proportional to the area of the annular ring 407. The diameter of the shaped post at a given flow-numeral should therefore be proportional to the area of the annular ring 407 at that flow-numeral. Referring to Table 1, for a first iteration, the designer determines experimentally the area of the annular ring that provides a flow rate of 6 minutes when the lever is set at Flow-numeral 1. Then the designer sets the shaped post 402 diameter at each flow-numeral 2 through 8 so that the annular ring provides the flow rates of Table 1. Experimental iterations will then refine the shape to give the desired flow rate at each flow-numeral.

Figure 20B:
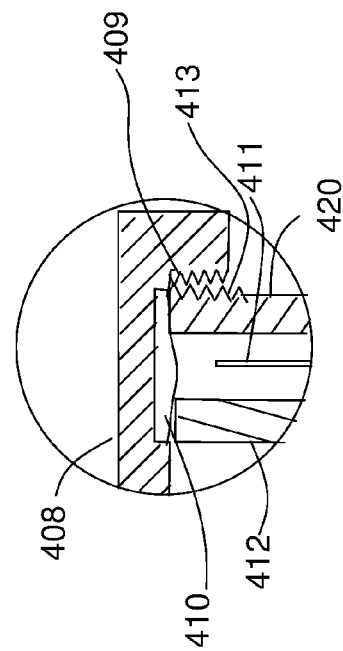
FIG. 20B gives a detail of FIG. 20A.
Figure 20A:
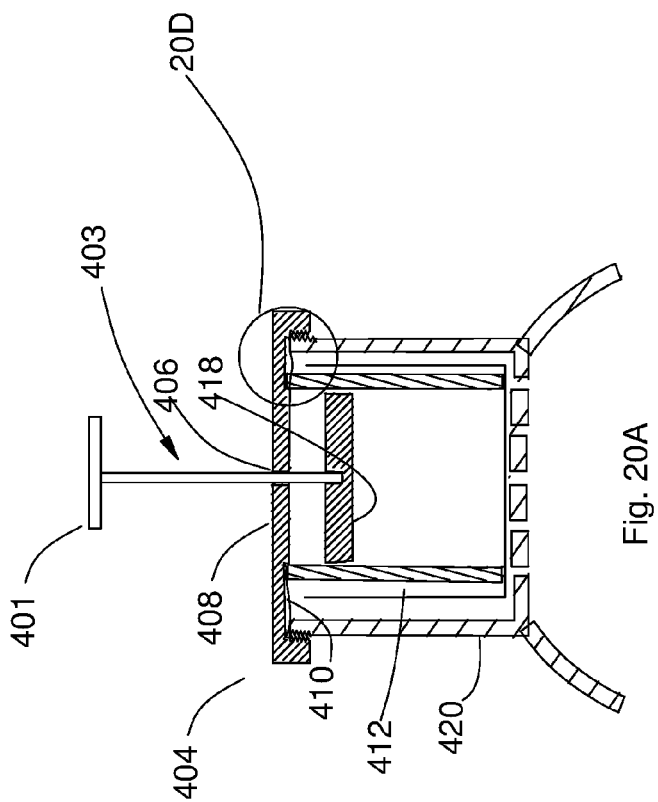
FIG. 20A illustrates a sectional view of the fourth embodiment that includes the plunger component.

FIG. 20A illustrates a sectional view of the fourth embodiment that includes the plunger component 403. FIG. 20B gives a detail of FIG. 20A. Following are some of the changes of the fourth embodiment as compared to the previous embodiments. A threaded plunger cap 408 is included that has female threads 409. The cylindrical tube 126 of the previous embodiments is replaced by a cylindrical tube 412. Referring to FIGS. 20A and 20D, cylindrical tube 412 has an open bottom and male threads 413 that are matched to the female threads 409 located on threaded plunger cap 408, Also included is a cylindrical seal 410 embedded in the threaded plunger cap 408. The plunger component 403 consists of a plunger handle 401, threaded plunger cap 408 and a plunger seal 418. Referring to FIG. 20A the plunger handle 401 fits in a hole 406 located in the center of the threaded plunger cap 408 and is attached at the handle's bottom to a plunger seal 418. In operation, the threaded plunger cap 408 screws onto the threaded container. The threaded container 420, the threaded plunger cap 408 and the cylindrical seal 410 form a tight fit preventing liquid from passing through.

FIGS. 21A through 21C illustrate the use of the fourth embodiment in making Expresso type coffee. Referring to FIG. 21A, the brewer is placed on a coffee cup 105, filter paper 411 is then pushed into the threaded container 420 using the cylindrical tube 412. The cylindrical tube 412 is left in the threaded container 420. Coffee grounds 133 and heated water 131 is poured into the cylindrical tube 412, the actuator 404 (see FIGS. 17 and 18B) is rotated so the liquid has a zero flow rate. The threaded plunger cap 408 with the plunger component 403 installed and raised as shown in FIG. 21A is screwed onto the threaded container 420 and tightened.

Referring now to FIG. 21B, the actuator 404 (see FIGS. 17 and 18B) is rotated so liquid can flow, and the plunger component 403 is pushed down, forcing the brewed coffee into the coffee cup 105. The coffee grounds 133 remain captured in the filter paper 411 under the plunger seal 418.

Referring now to FIG. 21C, the threaded plunger cap 408 is unscrewed and the threaded plunger cap, together with the plunger handle and plunger seal 418, is raised away from the threaded container 420. The coffee grounds 133 remain in the filter paper 411, which remains in the threaded container 420. The threaded container 420 is then removed from the coffee cup 105, and the paper filter with the coffee grounds 133 is discarded.

The advantage of this embodiment is that to make Express coffee with the fourth embodiment, only one additional part is required: the plunger component 403. In addition, unlike traditional plunger type coffee brewers which require disposing the coffee grounds down the sink drain, this embodiment disposes the coffee grounds contained in the filter paper into the garbage, a preferred method.

Figure 22:
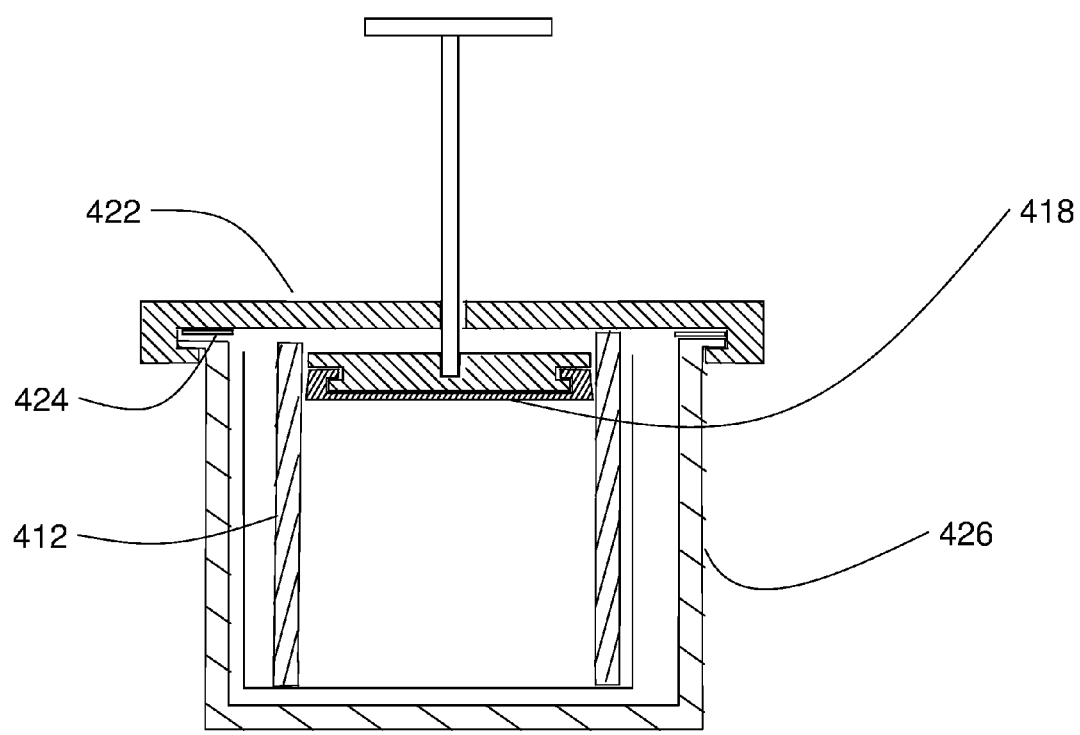
FIG. 22 illustrates an alternate embodiment to the fourth embodiment that uses a mechanism that seals the plunger cap to the container when using the plunger component.

FIG. 22 illustrates an alternate embodiment to the fourth embodiment. Rather than using matching threads in the threaded container 420 and the threaded plunger cap 408, an overhang plunger cap 422 is used with a lipped container 426. The overhang plunger cap 422 has two overhangs 428 that snap onto two lips 430 located on the lipped container 426 when the overhang plunger cap 422 is twisted onto the lipped container 426. A cylindrical seal 424 is used to prevent leakage between the threaded container 420 and the threaded plunger cap 408.

Single Cup Coffee Brewer: Integrating the Dripper Component and the Drip Rate Control Component The Single Cup Coffee Brewer described above is superior to the previously discussed prior art in that it provides the following advantages and features:

It uses a standard paper filter. Depending on the amount of brewed coffee desired, it can be configured to accommodate Number 4 paper filter (8-inch flat diameter) or 12 cup commercial paper filter (9½ flat diameter) or other sizes.

It is easy to dispose of the coffee grounds as compared to coffee brewers that use metal filters The cylindrical shape of the container with a flat bottom assures even dripping as compared to those devices that use cone filters.

The single cup coffee brewer presented herein has drip rate control capability, not available in other prior art single cup brewers discussed above.

The profile of the single cup coffee brewer is smaller than the cone based coffee brewers with the same liquid capacity By combining the dripper component 124 and the second drip rate control component 340 as indicated in FIG.

16, a large number of brewing options are available to a user. To give three simple examples, the coffee brewer can be used:
1) as a dripper with a user setting the drip time at four minutes;
2) as an infuser with an infuser time set to four minutes followed by dripping with drip time of 30 seconds; or
3) as an infuser with an infusion time of two minutes followed by dripping with a drip time set to two minutes. In all these examples, after dripping is complete, the paper filter containing the coffee grounds are easily disposed of.

It will be obvious to those skilled in the art that other embodiments of a single cup coffee brewer using different dripper and drip rate control components are consistent with the teachings of the present invention. For example, the perforated bottom of the brewing container may be replaced by any mechanism that in practice will allow the wrapped tube 128 in which the bottom of the filter paper is allowed to fit snugly against the bottom of the container and will allow the brewed coffee to drain through, such as a metal or plastic screen.

Instead of using standard filter paper, the filter paper may be customized by having indicia on it to enable the centering the paper filter 130 on the cylindrical tube 126 as shown in FIG. 3D. Additional indicia may be used on the filter paper to indicate the amount of coffee grounds and the amount of water added to the installed filter paper. Concentric circles with appropriate markings on the filter paper is one way of implementing this. Of course, the indicia must be the type that would not affect the brewing coffee.

DISCUSSION

In the previous description and figures, the wrapped tube 128 appears to be wrapped neatly. In practice any wrapping in which the bottom of the filter paper is allowed to fit snugly against the brewing container bottom drainage part 138 will work.

Temperature control is an important part of controlling the brewing process. It is noted that the single cup coffee brewer introduced here has a cylindrical tube and a brewing container with filter paper positioned in between the two; these three barriers create an insulation effect. Most other commercially available single cup brewers have only a single barrier.

Although the detailed description section of this application refers mainly to coffee applications, it applies equally well to tea and other brewed products. Also, additional enhancements may occur to those skilled in the art. For example, a cap could be added to provide enhanced temperature control. Other additions to the cap may include a thermometer with a probe, and a timer. Also, the brewing container may be constructed to have insulation or a vacuum barrier.

The disclosure presented herein gives multiple embodiments of the present invention. These embodiments are to be considered as only illustrative of the invention and not a limitation of the scope of the present invention. Various permutations, combinations, variations, and extensions of these embodiments are considered to fall within the scope of this invention.

What is claimed is:

1. A coffee or tea brewer comprised of a brewing container and a drip rate control component wherein:

said brewing container having a brewing container shape of a cylindrical container having a bottom, said bottom having a base hole;

said drip rate control component being attached to said brewing container;

said drip rate control component being comprised of a base part and an actuator part;

said base part having a base shape of a concave downward object with a circular horizontal cross section, said base part having a cylindrical hollow receptacle positioned at top of said base part and attached to bottom of said brewing container such that said base hole and said cylindrical hollow receptacle being operationally adapted so that said coffee or tea brewer being capable of draining liquid; and said actuator part being rotationally connected to said base part being capable of rotating in at least three distinct rotational positions; each rotational position controlling drip rate;

wherein when said actuator part is positioned in a first rotational position, then said drip rate is zero, and when said actuator part is positioned in a second rotational position and a third rotational position respectively, then said drip rate of said second rotational position is positive and is less than said drip rate of said third rotational position, and furthermore said drip rate control component is configured to control said drip rate without being dependent on gravity.

2. A coffee or tea brewer comprised of a brewing container and a drip rate control component:

said brewing container having a cylindrical shape with a bottom, said bottom having a base hole;

said drip rate control component being comprised of a base part and an actuator part;

said base part having a base shape of a concave downward part having a circular horizontal cross section;

said base part being attached to said bottom of said brewing container, said base part having a cylindrical hollow receptacle such that said base hole and said cylindrical hollow receptacle having a vertical cylindrical opening being capable of draining a liquid;

said actuator part being comprised of a circular actuator ring, a post and a lever, said lever being attached to said actuator part;

said circular actuator ring being capable of draining said liquid, said post being attached to a center of said circular actuator ring;

said base part having a first slot, said first slot receives said lever, a portion of said lever protruding outside of said base part;

said post being positioned inside said cylindrical hollow receptacle, said post being operationally adapted so that said post moves in a vertical direction when said actuator part is rotated, wherein a vertical position of said post being capable of determining drip rate;

said actuator part being rotationally attached to said base part being capable of rotating in at least three distinct rotational positions when said portion of said lever is moved within said first slot;

wherein when said portion of said lever is positioned at a first rotational position said post is positioned causing a drip rate of zero, and when said portion of said lever is rotated to second rotational position, said post is positioned causing said drip rate to have a positive drip rate, and when said lever is rotated to third rotational position, then said post is positioned causing said drip rate to have a value greater than that said drip rate of said second rotational position.

3. The coffee or tea brewer of claim 2; wherein
said base part having a second slot and a third slot, said actuator part having at a first tab and a second tab, said first tab adapted to fit in said second slot, and said second tab adapted to fit in said third slot;
said three slots, said two tabs and said lever being operationally adapted so that when said portion of said lever is moved within said first slot, then said actuator part moves vertically wherein
when said portion of said lever is positioned in said first rotational position then said drip rate is zero, and when said portion of said lever is rotated to said second and said third rotational position respectively, then said drip rate of said second rotational position is positive, and said drip rate of said third rotational position is positive and greater than said drip rate of said second rotational position.

4. The coffee or tea brewer of claim 3 wherein
said actuator part additionally having a flexible plug being attached to said post, so that when said portion of said lever is rotated to said first rotational position, then said flexible plug and said cylindrical hollow receptacle being operationally adapted so that said drip rate is zero, and when said portion of said lever is rotated to said second and said third rotational position respectively, then said flexible plug and said cylindrical hollow receptacle are operationally adapted so that said drip rate is of said second rotational position is positive, and said drip rate of said third rotational position is positive and greater than said drip rate of said second rotational position.

5. The coffee or tea brewer of claim 3 wherein said post having a post shape adapted to control said drip rate when said post is moved vertically, so that when said portion of said lever is rotated to said first rotational position, then said post and said cylindrical hollow receptacle being operationally adapted so that said drip rate is zero, and when said portion of said lever is rotated to said second and said third rotational position respectively, then said post and said cylindrical hollow receptacle are operationally adapted so that said drip rate is of said second rotational position is positive, and said drip rate of said third rotational position is positive and greater than said drip rate of said second rotational position.

6. The coffee or tea brewer of claim 2; wherein said actuator part having a first guide ring and said base part having a second guide ring, said first guide ring and said second guide ring having matching threads wherein said matching threads are adapted so that when said actuator part is rotated, then said actuator part moves vertically enabling control of said drip rate;
said post being operationally adapted so that when said portion of said lever is moved within said first slot, then said actuator part moves vertically so that when said portion of said lever is positioned in said first rotational position then said drip rate is zero, and when said portion of said lever is rotated to said second and said third rotational position respectively, then said drip rate of said second rotational position is positive, and said drip rate of said third rotational position is positive and greater than said drip rate of said second rotational position.

7. The coffee or tea brewer of claim 6 wherein
said actuator part additionally having a flexible plug being attached to said post, so that when said lever is rotated to said first rotational position, then said flexible plug and said cylindrical hollow receptacle being operationally adapted so that said drip rate is zero, and when said lever is rotated to said second and said third rotational position respectively, then said flexible plug and said cylindrical hollow receptacle are operationally adapted so that said drip rate is of said second rotational position positive, and said drip rate of said third rotational position is positive and greater than said drip rate of said second rotational position.

8. The coffee or tea brewer of claim 6 wherein
said post having a post shape adapted to control said drip rate when said post is moved vertically, so that when said portion of said lever is rotated to said first rotational position, then said post and said cylindrical hollow receptacle being operationally adapted so that said drip rate is zero, and when said portion of said lever is rotated to said second and said third rotational position respectively, then said post and said cylindrical hollow receptacle are operationally adapted so that said drip rate is of said second rotational position is positive, and said drip rate of said third rotational position is positive and greater than said drip rate of said second rotational position.

\* \* \* \* \*